(12) United States Patent
Yamashita

(10) Patent No.: US 10,144,589 B2
(45) Date of Patent: Dec. 4, 2018

(54) METHOD OF ORDER FULFILLING AND REPLENISHMENT OF STORAGE UNITS

(71) Applicant: Dematic GmbH, Heusenstamm (DE)

(72) Inventor: Shin Yamashita, Oberursel (DE)

(73) Assignee: Dematic GmbH, Heusenstamm (DE)

( * ) Notice: Subject to any disclaimer, the term of this patent is extended or adjusted under 35 U.S.C. 154(b) by 394 days.

(21) Appl. No.: 14/996,927

(22) Filed: Jan. 15, 2016

(65) Prior Publication Data
US 2016/0130085 A1    May 12, 2016

Related U.S. Application Data

(63) Continuation of application No. PCT/EP2014/063931, filed on Jul. 1, 2014.

(30) Foreign Application Priority Data

Jul. 17, 2013 (EP) .................................... 13176796

(51) Int. Cl.
  *B65G 1/137*   (2006.01)
  *B65G 1/06*    (2006.01)
  *B65G 1/04*    (2006.01)

(52) U.S. Cl.
  CPC ............. *B65G 1/1373* (2013.01); *B65G 1/06* (2013.01); *B65G 1/1378* (2013.01); *B65G 1/0407* (2013.01)

(58) Field of Classification Search
  CPC .................................................. B65G 1/1373
  See application file for complete search history.

(56) References Cited

U.S. PATENT DOCUMENTS 7,331,471 B1   2/2008  Shakes et al.
7,363,104 B2 * 4/2008  Stevens .................. A47B 53/00
                                                      700/213

(Continued)

FOREIGN PATENT DOCUMENTS

CN    85105025 A    1/1987
CN   102633077 A    8/2012

(Continued)

OTHER PUBLICATIONS

International Search Report for PCT/EP2014/063931, dated Sep. 16, 2014.
Written Opinion for PCT/EP2014/063931, dated Sep. 16, 2014.

*Primary Examiner* — Jonathan Snelting
(74) *Attorney, Agent, or Firm* — Womble Bond Dickinson (US) LLP

(57) ABSTRACT

A method of order fulfilling and replenishment of storage units in a storage facility can be provided. The storage units can be stored in a plurality of storage racking units and levels of a storage racking, with at least one storage-entry feeding line and at least one outbound line being provided for each storage module. Additionally, at least one automatic storage and retrieval device can be provided for retrieval of storage units from the multilevel racking or storage into the multilevel racking, and at least one picking station to which storage units are fed can also be provided for picking for fulfilling orders. Thus, fully or partially deplenished or depleted storage units can be replenished or consolidated on the fly directly at the picking station by the picker.

13 Claims, 1 Drawing Sheet

(56) References Cited

U.S. PATENT DOCUMENTS

| | | | | |
|---|---|---|---|---|
| 7,722,307 B2* | 5/2010 | Bell | .................. | B65G 1/023 |
| | | | | 198/718 |
| 8,276,739 B2* | 10/2012 | Bastian, II | ............ | B65G 1/026 |
| | | | | 198/347.1 |
| 8,327,609 B2 | 12/2012 | Krizmanic et al. | | |
| 8,335,585 B2 | 12/2012 | Hansl et al. | | |
| 8,827,619 B2* | 9/2014 | Schafer | ................ | B65G 1/1378 |
| | | | | 414/268 |
| 2011/0295413 A1 | 12/2011 | Nara et al. | | |

FOREIGN PATENT DOCUMENTS

| | | |
|---|---|---|
| CN | 202440058 U | 9/2012 |
| CN | 102887319 A | 1/2013 |
| CN | 103144915 A | 6/2013 |
| DE | 29912230 U1 | 12/1999 |
| DE | 20112328 U1 | 3/2002 |
| DE | 10234150 A1 | 5/2003 |
| DE | 102009032406 A1 | 1/2011 |
| EP | 1486435 A1 | 12/2004 |
| JP | 1-308308 | 12/1989 |
| JP | 7-206111 | 8/1995 |
| JP | 10-167422 | 6/1998 |
| JP | 2000-118630 | 4/2000 |
| JP | 2001-261116 | 9/2001 |
| JP | 2001-270605 | 10/2001 |
| JP | 2003-104518 | 4/2003 |
| JP | 2010-269807 | 12/2010 |

\* cited by examiner

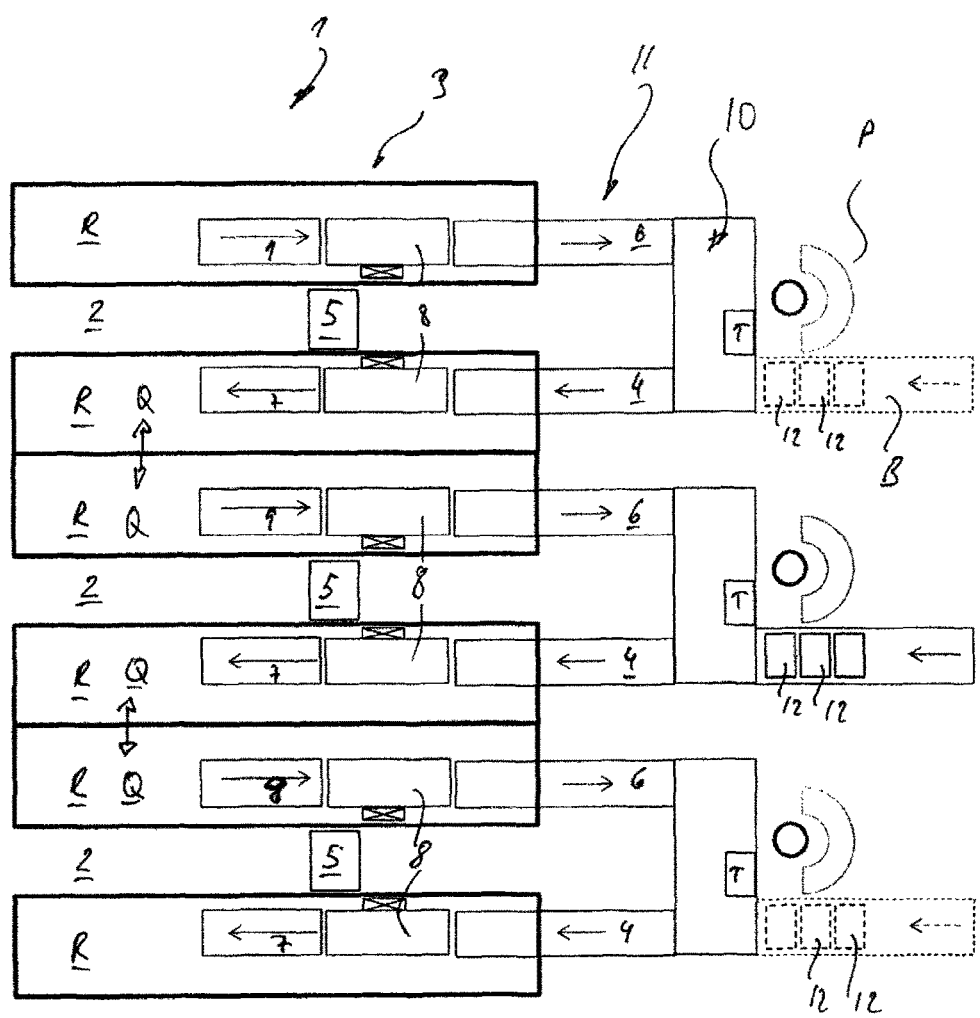

METHOD OF ORDER FULFILLING AND REPLENISHMENT OF STORAGE UNITS

CROSS REFERENCE TO RELATED APPLICATIONS

This present Patent Application is a continuation of International Application No. PCT/EP2014/063931, filed Jul. 1, 2014, by the inventor named in the present Application, and claims the benefit under 35 U.S.C. § 119(a) of European Patent Application No. EP 13176796.4 entitled "Method of Order, Fulfilling and Replenishment of Storage Units" filed on Jul. 17, 2013, both of which patent applications are incorporated by reference in their entireties as though fully set forth herein.

TECHNICAL FIELD

Embodiments of the present disclosure relate to a method of order fulfilling and replenishment of storage units in a storage facility.

BACKGROUND

When picking or compiling orders from transporting units, such as e.g., articles or containers, it is may be necessary to provide the transporting units, which are associated with a common order, in a directed or sorted fashion. In addition, it is conventional to intermediately store (buffer) the transporting units of an order, until all of the transporting units required for the order are present. They are then passed together onto a collecting line which leads them e.g. to the palletisation area, picking station, goods issue, shipment, etc.

In the picking station the goods for fulfilling an order are taken from the transporting or storage units and placed according to the order into an order container etc. The storage container (often called donor) is then routed back into the (high bay) racking storage and stored until needed for the next order.

A (high bay) racking storage facility includes a storage-entry area, via which the goods are supplied to and from which the Automatic Storage and Retrieval Machine (hereafter called AS/RS) collect the goods for placement in storage, the so-called front-zone. In a similar manner, a retrieval area is required, at which after retrieval from storage the AS/RS deposit the goods which are likewise assigned to the front-zone. In the case of automatic goods to the person picking storage facilities, picking locations are typically situated in the front-zone. In the front-zone, the goods are also identified for the inventory management system or the material flow computer.

EP 1 964 792 B1 by the present applicant discloses a method of making transporting units available from a storage facility on at least one collecting conveyor, wherein AS/RS in each storage racking aisle, retrieval-from-storage and outbound lines are so controlled, in such a way as to be matched to one another, and are loaded with goods that ultimately they end up on, or are discharged from, the collecting line in a sorted fashion.

The control and matching are thus relatively complex and require evident technical work in the so-called front-zone, i.e., the area outside the actual racking.

Additionally, it can be necessary to replenish those storage containers etc. from which a picker in the picking station has taken goods to fulfill orders. Usually this is done by means of inducting fully loaded storage units (also often called donor units as they function as a donor from which is picked) from inbound conveyor line and empty donor is removed from the system.

This is necessary for several reasons, e.g., storage containers need to be filled with goods to perform picking.

However, these operations may cause poor cubic utilization of donor as those are half empty in average if it is operated as per above. To prevent this from happening, a separate operation called "consolidation" can be implemented. This consists of operations retrieving several partial donor units, consolidating contents of those into one donor and remove empty donor from the system. This is done in the dedicated station or same pick station but during off peak hours, e.g. during the night, week end etc.

In contrast thereto, one object of the present disclosure is to provide a combined method of order fulfilling and replenishment which permits a more efficient way of replenishment of storage units. Additionally, the method may provide sorted retrieval from storage in a simpler manner or without sortation outside of the isles so as to reduce technical complexity, space, lower cost and increase reliability. Embodiments discussed herein may achieve this object and address other related and non-related problems in the art.

SUMMARY

In accordance with embodiments of this disclosure, it has been recognized that if storage units are fed for picking for fulfilling orders and deplenished storage units are replenished (and/or consolidated) on the fly directly at the picking station by the picker, it is possible to increase storage density as well as the multiplicity of stored goods. Therefore required storage locations to store required stock may be minimized and the availability of goods in a given aisle also can be increased.

It also may not be necessary for the storage units (e.g., containers, trays, totes etc.; see below) to leave the conveyors or transport system, which are installed at best working height so that the method is ergonomic.

Also, the throughput of the whole system can be improved as the AS/RS, lifts, conveyors etc., may be used for fulfilling orders and no additional operation to deal with dedicated replenishment or consolidation is required.

The goods for replenishment are buffered at the picking station directly, e.g., on a separate conveyor for this means within range, so that the picker may quickly and ergonomically grasp the good for replenishment. The buffer can carry/hold several replenished totes so that the operator directed by IT can choose the most ideal article for each donor to be replenished, and the buffer may be allocated only at selected or all picking stations depending on frequency of replenishment. If only selected picking stations are equipped with a buffer, only storage units stored in the aisle connected to those picking stations may be replenished initially. However, over the time replenished storage units can eventually be transferred to other aisles via cross conveyance locations within the rack and fully or partially depleted storage units to be replenished can eventually be transferred to the aisles connected to those picking stations via cross conveyance locations as a part of overall picking operation.

In addition, the goods can be replenished randomly into storage units, for example, such that the storage units carry several different articles/goods for picking. The operation system tracks contents and location of the products within the storage unit, so that this chaotic but well controlled and tracked storage is actually beneficial as it creates a uniform distribution of products throughout the storage.

Additionally, the transporting or storage units themselves can be placed in storage randomly ("chaotically"), distributed over the entire system without knowledge of the subsequent sequence when they are retrieved. In contrast to DE 299 12 230 U1 no restriction as to possible modules or storage areas may be required.

It is also possible to exchange fully depleted storage units with fully replenished storage units at the picking station in a single exchange or switch of units as a whole, which saves times and effort, especially if the storage unit is almost empty. Independent rejection of empty storage units and induction of fully loaded storage units is also possible.

"Consolidation by opportunity" can be performed under certain conditions as a kind of replenishment. Under such an operation mode, a donor storage unit may not go back to storage immediately even after picking is done but the operator is instructed to perform a consolidation operation with the use of following load storage units being retrieved for fulfilling the order or next order(s). This operation requires the donor storage units to be retrieved one after another so retrieval sequence is defined based on consolidation activity, as well as order fulfilling sequence so it is performed only when order fulfilling sequence has some flexibility e.g., fulfilling single line orders or orders consisting of large number of order lines. This operation can be performed irrespective of the provision of incoming buffer.

In accordance with a further aspect of this disclosure, the storage units may be segmented, so that, for example, the units may be subdivided inside so allow for several compartments into which separate goods/articles may be placed for easier reference or picking.

The storage can be a fully automated storage.

It is understood that where the term "storage units" or likewise "transporting units" is used, it is not to be interpreted as limiting; in fact other types of transport (e.g., trays, pallets, etc.), can also be used equally effectively within the scope of this disclosure. In particular, the term "transporting units" or "storage units" also includes totes, trays, containers, paperboard containers, carton boxes. These units can either be donor units, from which a picker takes articles for an order, so that these function as a donor (often also called product units), or these units can be order units for collecting articles of an order.

A storage module may be understood as at least a single aisle of a storage racking. It can, however, also refer to a storage area that includes several aisles of a storage racking, which are grouped. Such grouping can be either mechanical and/or organizational, meaning that is a kind of substorage of the whole storage and which may only be used for a subspectrum of the storage units.

With this so-called "replenishment and consolidation by opportunity," transporting or storage units can be exchanged directly between two adjoining storage racking units from one storage racking aisle to an adjacent storage racking aisle via cross conveyance locations in the storage racking units, distribution and/or complex sorting in the front-zone can be omitted, since the transporting units are already stored in single storage rack aisle even if initially they were stored elsewhere. When retrieved from storage, they may be simply retrieved in sequence out of a single aisle. Therefore, a direct transfer of the transporting units without distribution or sorting outside of the aisles can be achieved without "crossing" conveyors and this with a simpler and smaller technical installation with smaller space and higher reliability. The transporting or storage units can therefore just be retrieved from the respective aisle in the required sequence.

In other words, storage racking locations of abutting racking units can be used for passing transporting or storage units from one side of the racking through to the next, so that the transporting units can be transferred from one racking to the next.

Therefore, cross conveyance or sorting is possible inside the racking units themselves and accordingly it is possible to dispense with "cross conveyance" in the front-zone.

In an expedient manner, the cross conveyance locations are provided in each level or any selected level of the storage racking units.

Particularly, effective path-time optimization may be achieved if the cross conveyance locations are disposed closer to inbound and outbound conveyor line. It is also possible to locate cross conveyance locations at different positions within a level.

The exchange can be effected actively or passively with regard to the AS/RS, e.g., on the one hand the cross conveyance location can be simply a passive storage surface, on which the AS/RS of one aisle deposits transporting or storage units (quasi places them into storage) and from which the AS/RS of the adjacent aisle receives transporting units (quasi removes them from storage). For each racking storage location or cross conveyance location, this procedure can always be performed in one direction only or in both directions.

On the other hand, it is likewise possible to equip the cross conveyance location with corresponding conveyance technology, such as driven rollers, gravity flow track, idler roller, conveyor belts with or without a drive etc. The AS/RS can then deposit the transporting or storage units and the conveyance technology of the cross conveyance location performs transportation. The cross conveyance locations can also be equipped with a push mechanism for the transporting units.

By reason of the simplicity of the cross conveyance locations, it is also possible to subsequently retrofit or refit cross conveyance locations and to adapt flexibly to the level of efficiency required in the storage system.

The cross conveyance locations can thus optionally be configured for bidirectional or unidirectional exchange and/or for active or passive exchange.

For exchange purposes, the AS/RS can likewise place the transporting units in double-depth storage or multiple-depth storage in the cross conveyance location. The AS/RS of one aisle can thus place the transporting or storage units in storage in the cross conveyance locations to such a depth that they are already to be assigned to the adjacent racking and can be reached "normally" by the AS/RS.

In addition, the load receiving means, e.g., telescopic arms, can have an extended range.

It is also possible to use a stacked storage of transporting or storage units.

Since the cross conveyance locations are subjected to be utilized extensively and reduce a damage of transport or storage unit, it is expedient if the floors of the cross conveyance locations can be coated to reduce friction and/or structural reinforcement can be effected.

In addition, the AS/RS can be "miniloads" or single-level racking serving units, such as shuttles or satellite vehicles. Also, shuttles with a stacked arrangement of two load handling platforms or an elevating platform are to be used in connection with the invention for handling several levels from a single rail.

It is thus possible in accordance with embodiments of the present disclosure to achieve a particularly high level of retrieval efficiency whilst fully maintaining the desired sequence of transporting or storage units in any aisle. This may also be achieved with considerably less technical work than in accordance with the Prior Art.

In particular, so-called Multishuttles® as manufactured by Dematic Systems GMBH, can be used as the single-level AS/RS, such as described, e.g., in EP 1 254 852 A1. The Multishuttle® is a system which can be used universally, is constructed in a modular fashion and combines storage and transportation in an integrated concept. The Multishuttle® supplements the domain of automatic small parts storage facilities as a high-performance, inexpensive and innovative solution. It is a rail-borne vehicle which operates in the racking and serves the entire storage system. The system concept is based upon autonomous rail-guided vehicles for container transportation which operate inside and outside the storage system. A specific load receiving means permits short load-change times and simultaneous loading and unloading. The system has travel rails which are installed in each level of the storage facility or elevated or suspended in the pre-zone. In addition to guiding the vehicles, they also supply voltage thereto.

The shuttle can be used in two arrangements, a so called "captive" or "roaming" arrangement. In the captive arrangement the shuttle stay in their respective level. In the roaming alternative the shuttle change levels as required.

Possible outbound lifts include in particular vertical conveying means. It is favorable if each outbound lift has one or more, in particular two, locations/positions for the transporting or storage units.

Each level of the storage racking can have at least one buffer location for decoupling the single-level AS/RS and the outbound lift. This renders it possible to fully utilize the quicker single-level AS/RS and to prevent empty-running of the lift.

Each outbound lift is connected to one or more outbound lines, which may improve the sorting options and increases the number of orders which can be processed in parallel, or the number of stations which can be supplied.

In one example embodiment, the outbound lines are formed as accumulations conveyors. These may include a mechanical device for accumulation, e.g., a movable stop element.

Each outbound lift can also have a separately driven conveying means for each location. For example, each outbound lift has two locations which are each provided with a separately driven conveying means movable in different directions. Therefore, the transfer of two transporting or storage units for each level (e.g., in a previously standing arrangement) can always be effected simultaneously in different directions or onto different outbound buffers, e.g., to the left and right. In addition, the reception of the transporting units onto the lift is preferably controlled so that the two transporting/storage units are to be discharged onto one level. This is possible on account of the high efficiency of the shuttles used, since the transfer locations (buffer location) to the outbound lift are practically always occupied, so that for the control of the outbound lift there is provided a selection option which allows the lift to be occupied accordingly by transporting/storage units for different outbound buffers of one level.

The system can further be characterized by a high degree of flexibility, since the inbound and outbound feeding lines can be connected to the corresponding lifts at any points.

In parallel with the outbound lifts, it is likewise possible to provide dedicated inbound lifts with correspondingly supplying distribution feeding lines. On the other hand, it is also possible to control the outbound lifts such that in addition to the outbound operation they can also be used as inbound lifts. In the reverse scenario, optionally present dedicated inbound lifts can also be used as outbound lifts according to requirement. In the event of malfunctions of individual lifts, this also permits uninterrupted operation or an increase in system efficiency. To this end, the inbound or outbound lines can be disposed between the lift and racking at different heights, so as to ensure the presence of two similar combined inbound and outbound levels, the collecting lines of which are brought together after passing the last outbound line in sequence.

The transverse displacement function offers the advantage that, in the event of a malfunction of, e.g., an outbound lift/inbound lift or feeding lines, the function of the relevant aisle can be maintained.

Further features and details of the invention are apparent from the following description taken in conjunction with the accompanying drawings.

BRIEF DESCRIPTION OF THE DRAWINGS

The accompanying drawings, which are included to provide a further understanding of the embodiments of the present disclosure, are incorporated in and constitute a part of this specification, illustrate embodiments of the invention, and together with the detailed description, serve to explain the principles of the embodiments discussed herein. No attempt is made to show structural details of this disclosure in more detail than may be necessary for a fundamental understanding of the exemplary embodiments discussed herein and the various ways in which they may be practiced.

The FIGURE shows a schematic plan view of a storage facility according to an example embodiment.

DETAILED DESCRIPTION

As schematically shown in the FIGURE, a storage facility, which is designated as a whole by the reference numeral 1, can have a plurality of storage racking aisles 2 (storage module) and storage racking units R with a plurality of levels 3.

The storage racking units R can be disposed in such a manner that the storage racking units R, which are not disposed on the outside are each disposed in pairs adjoining one another and have a storage racking aisle 2 on one side. The storage racking units R located on the inside in each case may abut one another "back-to-back."

On the end side, at least one storage racking aisle 2 can be provided with a lift 8 having one or more locations in each case. In the lowermost or any level, the lift 8 is adjoined in each case by an inbound line 4 and a removal-from-storage feeding line 6. Corresponding inbound and outbound buffer lines 7 and 9 may be disposed between the lift 8 and the storage racking R in each level 3, in order to decouple the lift 8 from the single level AS/RS (also referred to as shuttles) which travel in the storage racking aisle 2.

The inbound feeding lines 4 and an outbound feeding line 6 are typically connected to suitable conveying lines for receiving, dispatch, picking locations, etc.

Each lift 8 can be connected to a picking station 10 forming a conveyor loop 11 with the storage-entry feeding line 4 and the outbound line 6, to which storage units T are fed for picking for fulfilling orders by the picker P.

The shuttles 5 can be provided in each storage racking aisle 2 and in each level 3 therein or provided each few levels if shuttle is equipped with elevating function, double or multiple deck design of load handling device (LHD) typically telescoping arm, all of which enabling to serve several levels. These are thus a so-called "captive" variant, in which the satellite vehicles 5 can be fixedly allocated to a level 3 and do not change levels or aisles, which theoretically would be possible. So-called "Roaming" variant that shuttle moves between levels to serve all rack levels with fewer shuttles would also be possible.

The shuttles 5 may include a transport platform for receiving/carrying the respective storage unit T (paperboard container, tray, totes, container, goods without any loading aids, etc.). Disposed in each case to the side on the transport platform are telescopic arms which push the storage unit T off, or pull it onto, the platform. In addition, the telescopic arms are extendible on both sides of the storage racking aisle 2 into the racking units R and have fingers which are movable in a known manner.

Particular exchange locations Q for cross-conveyance of storage units T from one racking R into the adjacent racking R can be provided in each level 3 of the storage racking units R, so that the storage units T are exchanged inside the storage racking units R themselves and it is possible to dispense with corresponding work in the pre-zone.

Therefore, the shuttle 5 or the telescopic arms thereof can deposit storage units T in the cross conveyance locations Q and push them to the corresponding location in the adjacent racking R. In addition, the respective storage unit T can be acted upon by the finger of the telescopic arms beyond a rear storage location of one cross conveyance location Q of the first racking R into the respective rear storage location of the adjacent cross conveyance location Q of the adjacent racking R.

In other words, the shuttle 5 can act as the active load handling means, such that the cross conveyance location Q may have no other active means of moving the respective storage unit T. The shuttle 5 (or in general the AS/RS) itself can displace the storage units T within the cross conveyance locations Q.

For the purpose of retrieval, the storage units T are taken from the storage racking R by the shuttle 5 and are discharged onto the retrieval buffer 9 which conveys the storage units T further to the lift 8 and thus to the outbound feeding line 6.

In the reverse scenario, placement in storage in the respective storage racking R can be effected by the inbound lines 4, the lift 8 and the storage buffer 7 and the shuttle 5.

The placement inbound and outbound can also be decentralized and they can take place at different locations in the storage racking R, e.g., integrated at different end sides or even to the side of the storage racking R.

The picker P takes the goods out of the storage unit T (coming from the conveyor out of the storage 1) and puts them into provided order carriers, such as, e.g., cartons or totes, etc., in a usual picking process for order fulfillment according to a certain order or job he is executing.

After processing, the storage unit T can be either transported back into the storage system 1 by conveyor 4 or replenished directly on the fly at the picking station 10 by the picker P.

The goods for replenishment can be buffered at the picking station 10 in storage units 12, for which the station has an incoming buffer conveyor B.

The picker P can, if there is enough space for putting goods into a storage unit T, put a share of the goods or a single item into this unit T after scanning both units (the replenishment unit 12 or article and the storage unit T) and then acknowledges the amount of goods put into the split storage unit T. The operation is guided, for example, by operation software and such guidance may include the storage unit to be replenished, products and there quantity and location of each product within the storage unit.

In other words, the storage units T may be replenished randomly but in a controlled and tracked manner and therefore contain a conglomeration or different articles, which is tracked by the operation software and warehouse database system.

The buffer conveyor B may be allocated only at selected or all pick station 10 depending on frequency of replenishment. If only selected pick stations 10 are equipped with buffer B, only donor storage units stored in the aisle 2 connected to those picking stations may be replenished initially. However, over the time replenished storage units can eventually be distributed over other aisles via cross conveyance locations Q within the rack and fully or partially depleted donor storage units to be replenished can eventually be transferred to the aisle 2 connected to those picking stations 10 via cross conveyance locations Q as a part of overall picking operation.

The replenished storage unit T can then be transported back into the storage system 1 by conveyor 4.

The picker P can be guided/supported in his choice by the operation system, from which buffered incoming replenishment units 12 which article is put into which split storage unit T.

Fully depleted/emptied storage units T may also be exchanged with fully loaded replenishment units 12 at the picking station 10 by exchanging a deplenished storage unit T for a fully loaded/replenished storage unit 12 from the buffer B. Independent rejection of empty storage units and induction of fully loaded storage units is also possible.

"Consolidation by opportunity" can be performed under certain conditions. Under such an operation mode, donor storage units will not go back to storage immediately even after picking is done but the operator is instructed to perform a consolidation operation with the use of following donor storage units being retrieved for fulfilling the order or next order(s). This operation requires the donor storage units to be retrieved one after another such that the retrieval sequence is defined based on consolidation activity, as well as order fulfilling sequence so it is performed only when order fulfilling sequence has some flexibility, e.g., fulfilling single line orders or orders consisting of large number of order lines. This operation can be performed irrespective of the provision of buffer conveyor B.

The corresponding structures, materials, acts, and equivalents of all means plus function elements in any claims below are intended to include any structure, material, or acts for performing the function in combination with other claim elements as specifically claimed. Those skilled in the art will appreciate that many modifications to the exemplary embodiments are possible without departing from the scope of the present invention. In addition, it is possible to use some of the features of the embodiments disclosed without the corresponding use of the other features. Accordingly, the foregoing description of the exemplary embodiments is provided for the purpose of illustrating the principles of the invention, and not in limitation thereof, since the scope of the present invention is defined solely by the appended claims.

The invention claimed is:

1. A method of order fulfilling and replenishment of storage units in a storage facility, comprising:
fulfilling one or more orders with goods stored in storage units; and
replenishing the storage units, wherein the storage units are stored in a plurality of storage racking units and multiple levels of a storage racking, the storage facility comprising:
at least one storage-entry feeding line;
at least one outbound line;
at least one automatic storage and retrieval device for retrieval of storage units from the multiple levels of storage racking or for storage into the multiple levels of storage racking; and
at least one picking station to which storage units are fed for picking for fulfilling orders;
picking storage units and placing picked goods into order carriers for fulfilling orders at the at least one picking station; and
replenishing or consolidating fully or partially depleted storage units directly at the at least one picking station by a picker.

2. The method according to claim 1, further comprising: buffering goods for replenishment at either all of a series of picking stations or at selected picking stations of the series of picking stations.

3. The method according to claim 2, wherein goods are only buffered at the selected picking stations.

4. The method according to claim 1, wherein fully depleted storage units are exchanged with fully replenished storage units at the picking station.

5. The method according to claim 1, comprising retrieving storage units based on consolidation activity, and order fulfilling sequence.

6. The method according to claim 1, wherein the goods are replenished randomly into storage units.

7. The method according to claim 1, wherein the storage units are stored randomly in the storage racking.

8. The method according to claim 1, wherein the storage units are segmented.

9. The method according to claim 8, wherein the automatic storage and retrieval device places the storage units in double-depth storage or multiple-depth storage in the cross conveyance locations for exchange purposes.

10. The method according to claim 1, comprising exchanging storage units directly between two adjoining storage racking units from one storage racking aisle to an adjacent storage racking aisle via cross conveyance locations.

11. The method according to claim 1, wherein the automatic storage and retrieval device includes a series of single-level rack-serving-machines.

12. The method according to claim 11, wherein the single-level rack-serving machines include shuttles.

13. The method according to claim 11, wherein the automatic storage and retrieval device includes a series of shuttles, wherein one or more shuttles of the series of shuttles includes an elevating platform or a double or multiple deck configuration, and wherein the one or more shuttles that include the elevating platform or the double or multiple deck configuration serve multiple rack levels.

* * * * *